United States Patent

Katsumi

(10) Patent No.: US 6,369,846 B1
(45) Date of Patent: Apr. 9, 2002

(54) MULTIPOINT TELEVISION CONFERENCE SYSTEM

(75) Inventor: Teruo Katsumi, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/452,786

(22) Filed: Dec. 2, 1999

(30) Foreign Application Priority Data

Dec. 4, 1998 (JP) .......................................... 10-346027

(51) Int. Cl.⁷ .............................................. H04N 7/14
(52) U.S. Cl. ...................... 348/14; 348/14.08; 348/14.1
(58) Field of Search .................... 348/140.01, 14.02, 348/14.03, 14.04, 14.05, 14.07, 14.08, 14.09; 370/260, 261; 709/204, 205; H04N 7/14

(56) References Cited

FOREIGN PATENT DOCUMENTS

| JP | 6-301393 | 10/1984 | |
| JP | 405207456 A | * 8/1993 | ............ H04N/7/15 |
| JP | 5-244587 | 9/1993 | |
| JP | 6-83391 | 3/1994 | |
| JP | 7-162827 | 6/1995 | |
| JP | 407336660 A | * 12/1995 | ............ H04N/7/15 |
| JP | 8-149440 | 6/1996 | |
| JP | 408256219 A | * 10/1996 | ............ H04M/7/56 |
| JP | 8 317363 | 11/1996 | |
| JP | 9-322136 | 12/1997 | |
| JP | 10-75310 | 3/1998 | |
| JP | 10-145763 | 5/1998 | |
| JP | 10-145764 | 5/1998 | |

OTHER PUBLICATIONS

Japanese Office Action issued May 24, 2000 in a related application with English translation of relevant portions.

* cited by examiner

Primary Examiner—Curtis Kuntz
Assistant Examiner—Melur Ramakrishnaiah
(74) Attorney, Agent, or Firm—Ostrolenk, Faber, Gerb & Soffen, LL (57) ABSTRACT

Disclosed is a multipoint television conference system, comprising terminals, and a multipoint control unit for controlling the terminals. Each of the terminals is provided for each attendee to the multipoint television conference. The multipoint control unit comprises plural detection means. Each of the plural detection means detects whether or not each attendee is speaking on the basis of an audio signal and video signal from each of the terminals in order to output a speaker detection signal representing a result of the detection. A determination means determines who are main speakers among the attendees on the basis of the speaker detection signals in order to generate a determination signal representing the main speaker. A combining means combines the video signals on the basis of the speaker determination signal in order to output the combined video signal to the terminals.

6 Claims, 5 Drawing Sheets

MULTIPOINT TELEVISION CONFERENCE SYSTEM

BACKGROUND OF THE INVENTION

1. Field of the Invention

The present invention relates to a multipoint television conference system having conference terminals disposed at a plurality of locations and a multipoint controlling unit (hereinafter, referred to as MCU) that mixes audio signals of the individual locations that are received from the individual conference terminals, distributes the mixed audio signal to the individual conference terminals, combines a video signal from the individual video signals that are received from the individual conference terminals corresponding to a selection signal, and distributes a combined video signal to the individual conference terminals.

2. Description of the Prior Art

A conventional multipoint television conference system is composed of one MCU and a plurality of conference terminals. When a conference attendee speaks to an assigned conference terminal, the speech is transmitted as an audio signal to the MCU.

Each conference terminal has an audio/video signal transmitting/receiving/transferring function, a video displaying function, and an audio outputting function. The MCU mixes audio signals received from conference terminals with each other and distributes the mixed audio signal to conference terminals. When each conference terminal transmits a video signal to the MCU, the MCU selects a video signal of one conference terminal. Alternatively, the MCU may combine video signals received from two or more conference terminals, distribute the combined video signal to each conference terminal and cause each conference terminal to display the combined video signal.

Figure 1:
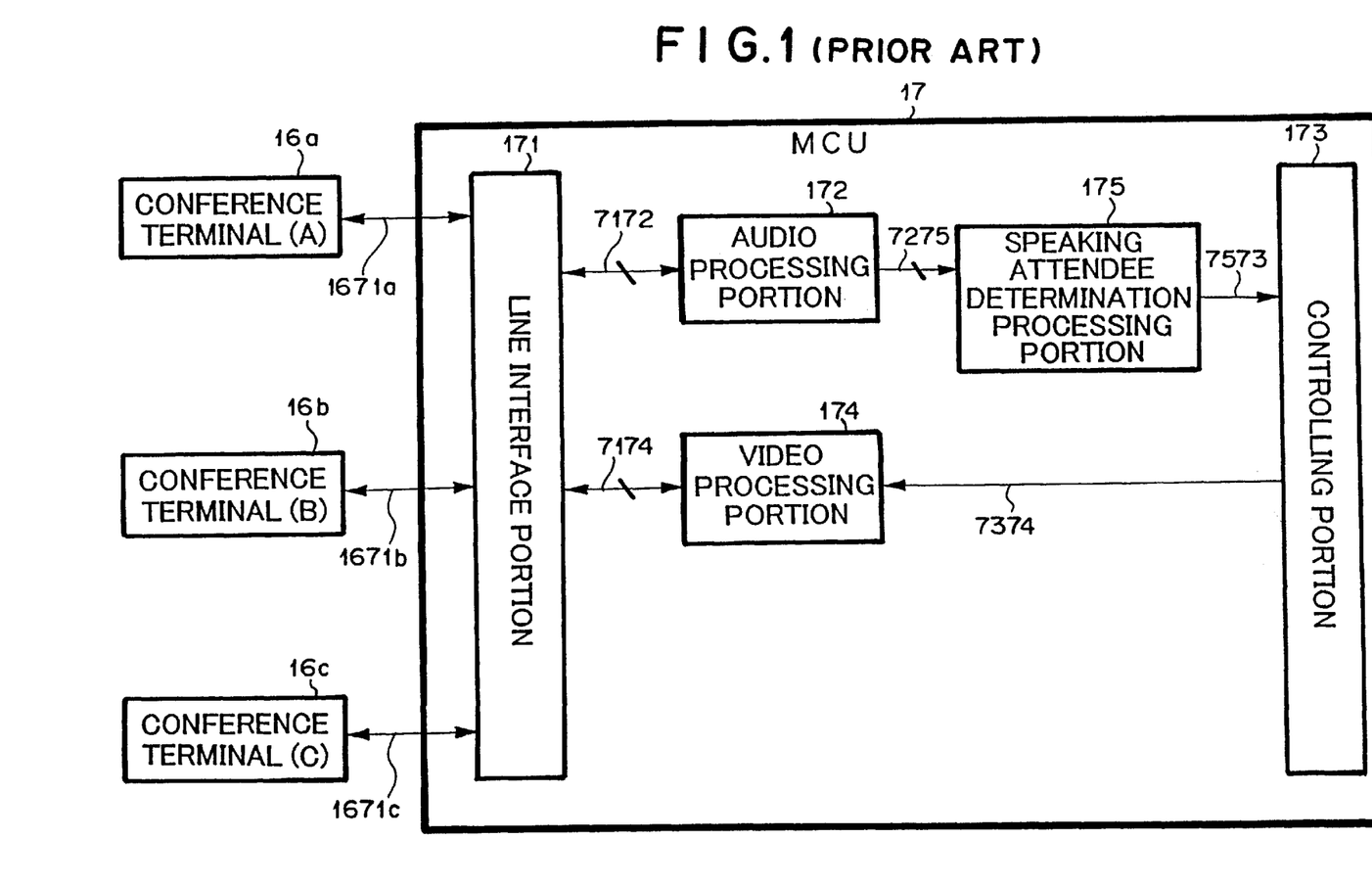
FIG. 1 is a block diagram showing the structure of a television conference system according to a prior art reference.

Next, with reference to FIG. 1, a conventional television conference system will be described. FIG. 1 is a block diagram showing the structure of the conventional television conference system. Referring to FIG. 1, the television conference system has a plurality of conference terminals 16a to 16c and one MCU 17. In this example, it is assumed that three people have a conference using respective conference terminals 16a to 16c.

The conference terminals 16a to 16c convert video signals and audio signals of respective locations (A) to (C) into transmission signals and transmit the transmission signals to the MCU 17 through communication lines 1671a to 1671c, respectively. The MCU 17 processes the video signals and audio signals in a particular manner that will be described later and distributes the resultant signals to the conference terminals 16a to 16c.

The MCU 17 comprises a line interface portion 171, an audio processing portion 172, a controlling portion 173, a video processing portion 174, and a speaking attendee determination processing portion 175.

The line interface portion 171 is connected to a plurality of conference terminals 16a to 16c. The line interface portion 171 transmits and receives video signals and audio signals as transmission signals. The audio processing portion 172 and the video processing portion 174 are connected to the line interface position 171 through connection lines 7172 and 7174, respectively.

The audio processing portion 172 decodes audio signals received from the conference terminals 16a to 16c and supplies the decoded signals to the speaking attendee determination processing portion 175 through a connection line 7275. The speaking attendee determination processing portion 175 determines a speaking attendee corresponding to the received audio signal and supplies the determined result as speaking attendee information to the controlling portion 173 through a connection line 7573.

The controlling portion 173 generates a video control signal for an image switching process and an image combining process with the input speaking attendee information and supplies the video control signal to the video processing portion 174 through a connection line 7374. In addition to the video control signal, video signals of individual conference terminals are supplied from the line interface portion 171 to the video processing portion 174 through the connection line 7174. The video processing portion 174 performs the image switching process, the image combining process, and so forth for the video signals corresponding to the video control signal. The video processing portion 174 encodes video signals and supplies the encoded video signals to the line interface portion 171 through the connection line 7174.

The audio processing portion 172 mixes the audio signals received from the conference terminals 16a to 16c, encodes the mixed signal, and supplies the encoded signal to the line interface portion 171. The line interface portion 171 multiplexes the processed audio signals and the processed video signals and distributes the multiplexed signal to all the conference terminals 16a to 16c through the connection lines 1671a to 1671c.

Figure 2:
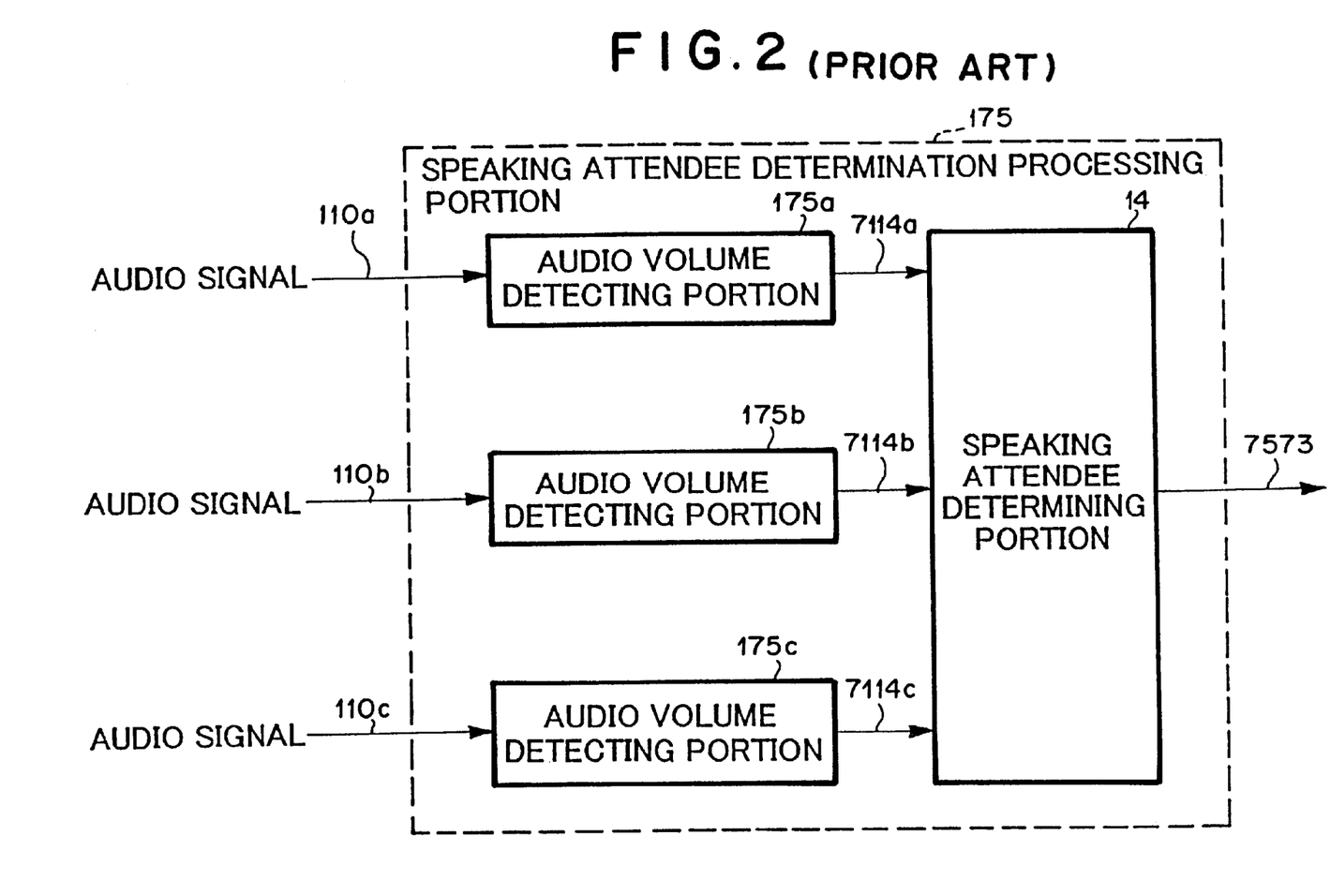
FIG. 2 is a block diagram showing the internal structure of a speaking attendee determination processing portion shown in FIG. 1.

Next, with reference to FIG. 2, the internal structure of the speaking attendee determination processing portion 175 will be described. Referring to FIG. 2, the speaking attendee determination processing portion 175 has audio volume detecting portions 175a to 175c. The audio volume detecting portions 175a to 175c receive audio signals from the audio processing portion 172 through connection lines 110a to 110c, respectively. The audio volume detecting portions 175a to 175c compare the audio volumes of the audio signals with a predetermined threshold value and transmits the comparison results as speaking attendee determination information to a speaking attendee determining portion 14 through connection lines 7114a to 7114c, respectively.

When an audio volume is equal to or higher than the predetermined threshold value in any of audio volume detecting portions 175a to 175c, the speaking attendee determining portion 14 determines that the conference terminal corresponding to the volume detecting portion has a speaking attendee. When the audio volume is lower than the predetermined threshold value in all of audio volume detecting portions 175a to 175c, the speaking attendee determining portion 14 determines that the conference terminals have no speaking attendees.

When a plurality of conference terminals have speaking attendees, the speaking attendee determining portion 14 determines that the conference terminal which has the longest time period in which an audio volume is equal to or larger than the predetermined threshold has a speaking attendee. The determined result is output as speaking attendee information to the controlling portion 173 through a connection line 7573.

In the conventional television conference system, the speaking attendee determination information is detected from audio signals received from the conference terminals. Generally, in addition to a voice of a conference attendee, an audio signal contains noise such as a page turning noise, a desk knocking noise, and a breathing noise. Moreover, when a conference is held at a place where there are many people, their voices may be contained in an audio signal. In this case, voices of other than conference attendees become noises.

Thus, the speaking attendee determination signal detected from audio signals may include errors. Consequently, it was difficult to accurately determine a conference terminal that has a speaking attendee in the prior art. If a conference terminal that has a speaking attendee is incorrectly determined, it is difficult to smoothly manage a television conference system.

SUMMARY OF THE INVENTION

In order to overcome the aforementioned disadvantages, the present invention has been made and accordingly, has an object to provide a television conference system which accurately determines conference terminals each having a speaking attendee without being disturbed by noises.

According to an aspect of the present invention, there is provided a multipoint television conference system, comprising: terminals, and a multipoint control unit for controlling the terminals, wherein each of the terminals is provided for each attendee to the multipoint television conference; and wherein the multipoint control unit comprises: plural detection means, each of the plural detection means detects whether or not each attendee is speaking on the basis of an audio signal and video signal from each of the terminals in order to output a speaker detection signal representing a result of the detection; determination means for determining who are main speakers among the attendees on the basis of the speaker detection signals in order to generate a determination signal representing the main speakers; and combining means for combining the video signals on the basis of the speaker determination signal in order to output the combined video signal to the terminals.

The system may further comprises mixing means for mixing the audio signals input from the terminals to output the mixed audio signal to the terminals.

In the system, the number of main speakers may be one, and the combining means may select the video signal from the terminal corresponding to the main speaker as a main in the combined video signal.

In the system, each of the plural detection means may comprise: volume detection means for detecting whether or not the audio signal from the corresponding terminal is louder than a first threshold to generate a voice detection signal; image recognition means for detecting whether or not a movement of a lip of the attendee to the corresponding terminal is larger than a second threshold to generate a movement detection signal; and means for generating the speaker detection signal on the basis of the voice detection signal and the movement detection signal.

In the system, the means for generating the speaker detection signal may activate the speaker detection signal when the audio signal is louder than the first threshold and the movement of the lip is larger than the second threshold simultaneously.

In the system, the determination means may comprise means for determining the main speakers on the basis of periods, in each of which each of the speaker detection signal is active.

These and other objects, features and advantages of the present invention will become more apparent in light of the following detailed description of the best mode embodiment thereof, as illustrated in the accompanying drawings.

DESCRIPTION OF PREFERRED EMBODIMENT

Figure 3:
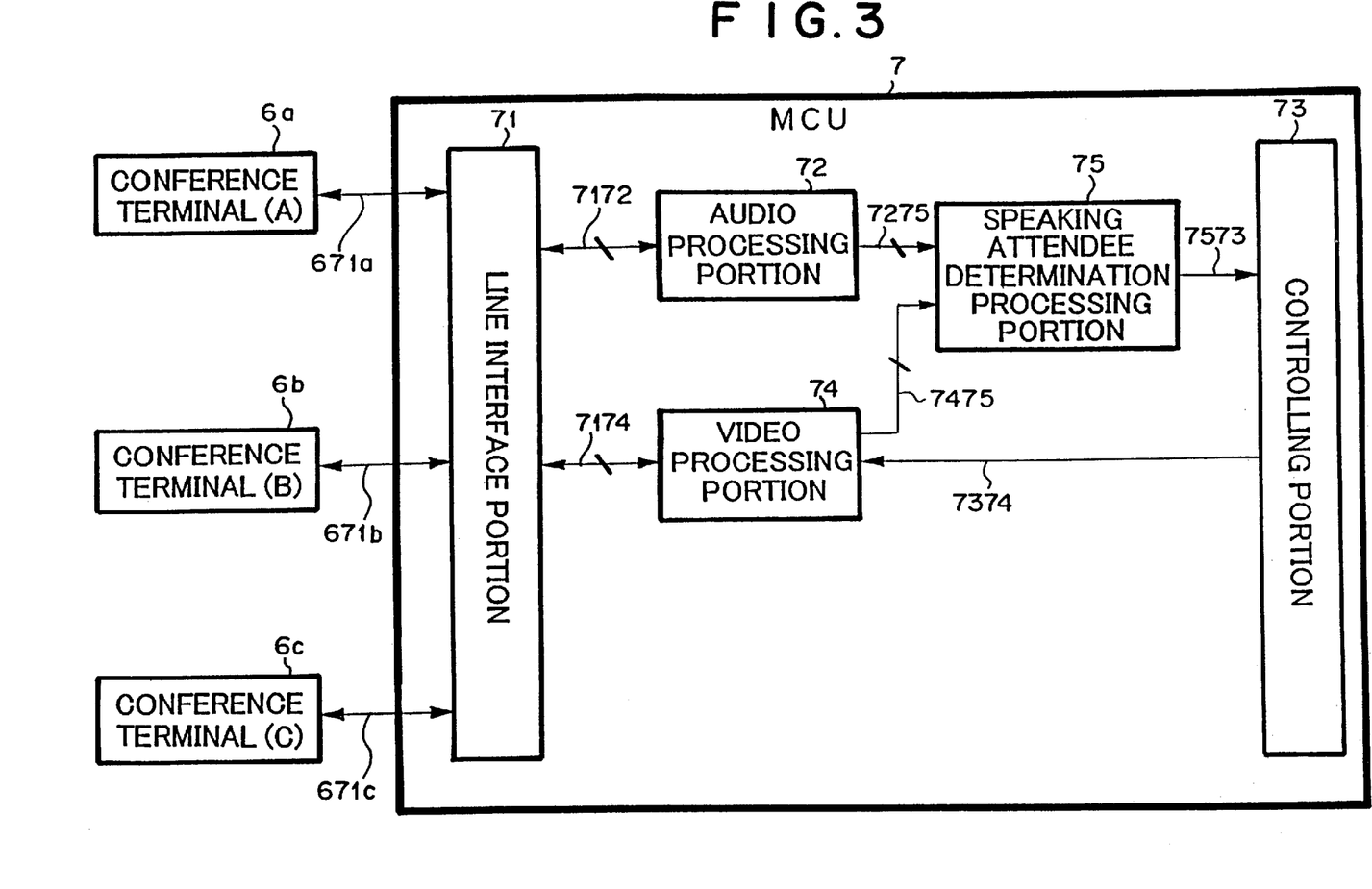
FIG. 3 is a block diagram showing the structure of a television conference system according to an embodiment of the present invention.

Next, with reference to the accompanying drawings, an embodiment of the present invention will be described. FIG. 3 is a block diagram showing the structure of a television conference system according to an embodiment of the present invention. Referring to FIG. 3, the television conference system has a plurality of conference terminals 6a to 6c and one MCU 7.

The conference terminals 6a to 6c multiplex video signals and audio signals of locations (A) to (C), convert the multiplexed signals into transmission signals, and transmit the transmission signals to the MCU 7 through communication lines 671a to 671c, respectively. The MCU 7 processes the video signals and audio signals in predetermined manners that will be described later and distributes the resultant signals to the conference terminals 6a to 6c.

The MCU 7 comprises a line interface portion 71, an audio processing portion 72, a controlling portion 73, a video processing portion 74, and a speaking attendee determination processing portion 75.

The line interface portion 71 is connected to the conference terminals 6a to 6c. The line interface portion 71 transmits and receives video signals and audio signals as transmission signals to/from the conference terminals 6a to 6c. In addition, the line interface portion 71 is connected to the audio processing portion 72 and the video processing portion 74 through connection lines 7172 and 7174, respectively. The line interface portion 71 converts the transmission signals received from the conference terminals 6a to 6c into video signals and audio signals and supplies these signals to the video processing portion 74 and the audio processing portion 72, respectively.

The audio processing portion 72 decodes the audio signals received from the conference terminals 6a to 6c and supplies the resultant signals to the speaking attendee determination processing portion 75 through a connection line 7275. On the other hand, the video processing portion 74 decodes video signals received from the conference terminals 6a to 6c and supplies the resultant signals to the speaking attendee determination processing portion 75 through a connection line 7475. The speaking attendee determination processing portion 75 determines one or more speaking attendees corresponding to the received video signals and audio signals in the manner that will be described later and supplies the determined result to the controlling portion 73 through a connection line 7573.

The controlling portion 73 generates a video control signal for an image switching process or an image combining process corresponding to received speaking attendee information and supplies the video control signal to the video processing portion 74 through a connection line 7374.

The video processing portion 74 performs an image switching process or an image combining process for the video signals on the basis of the video control signal, encodes the processed video signal, and supplies the encoded signal to the line interface portion 71 through the connection line 7174.

The audio processing portion 72 mixes audio signals received from the conference terminals 6a to 6c. In addition, the audio processing portion 72 extracts from the mixed audio signal an audio signal received from a conference terminal so as to prevent the received audio signal from howling, encodes the resultant audio signal, and supplies the encoded audio signal to the line interface portion 71. The line interface portion 71 multiplexes the processed video signals and audio signals and distributes the multiplexed signal to the conference terminals 6a to 6c through the connection lines 6a to 6c, respectively (refer to JPA 10-75310).

Figure 4:
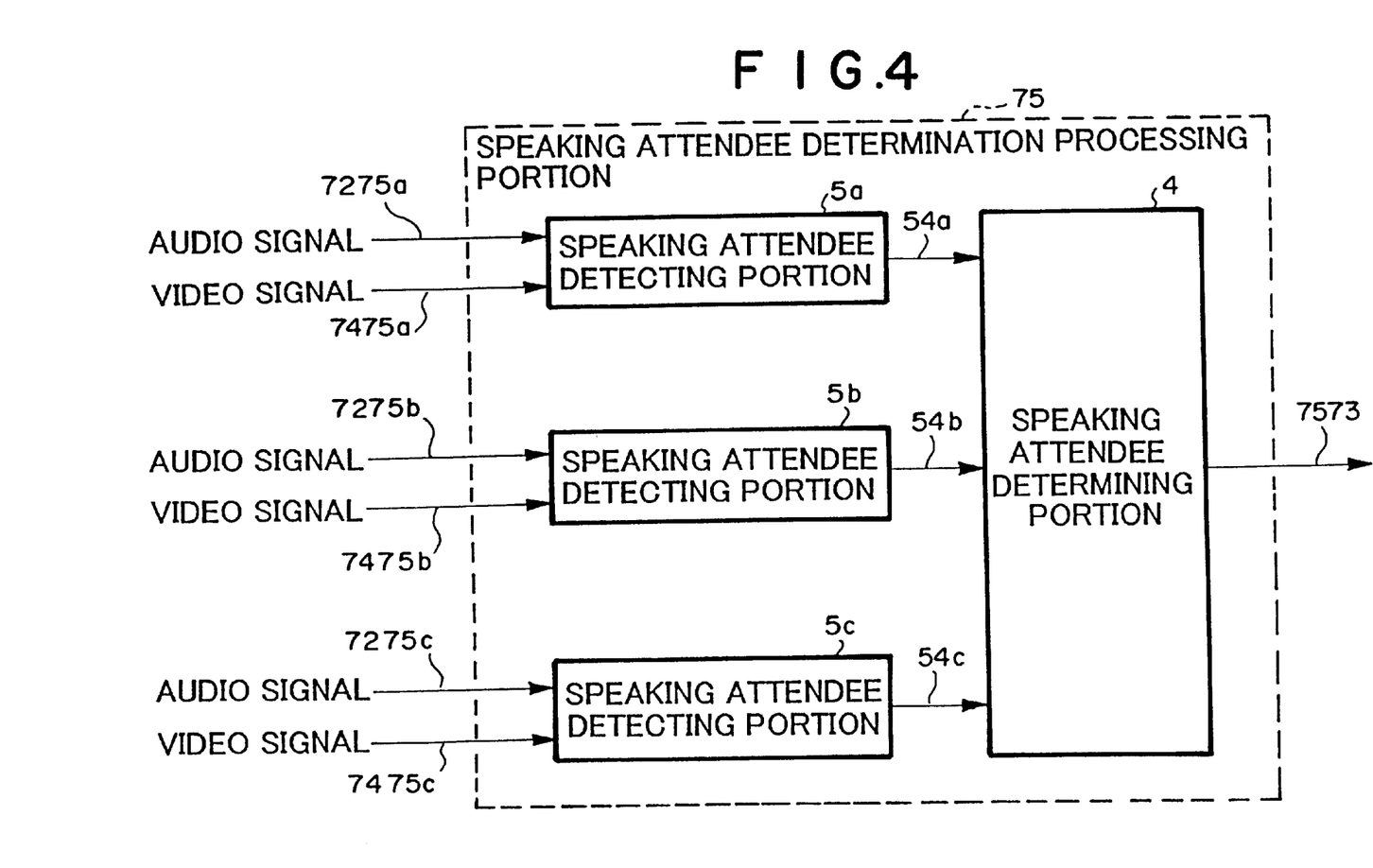
FIG. 4 is a block diagram showing the internal structure of a speaking attendee determination processing portion shown in FIG. 3.

Next, with reference to FIG. 4, the speaking attendee determination processing portion 75 will be described. FIG. 4 is a block diagram showing the internal structure of the speaking attendee determination processing portion 75. The speaking attendee determination processing portion 75 comprises speaking attendee detecting portions 5a to 5c and a speaking attendee determinating portion 4. The speaking attendee detecting portions 5a to 5c receive audio signals from connection lines 7275a to 7275c and video signals from connection lines 7475a to 7475c, respectively.

As will be described later, each of the speaking attendee detecting portions 5a to 5c detects the power of the audio signal. In addition, each of the speaking attendee detecting portions 5a to 5c extracts an image of the lip portion of a conference attendee from the video signal and detects the change of the opening and closing actions thereof. The speaking attendee detecting portions 5a to 5c supply the detected results as speaking attendee determination information to the speaking attendee determining portion 4 through connection lines 54a to 54c, respectively. The speaking attendee determining portion 4 supplies the determined result as speaking attendee information to the controlling portion 73 through a connection line 7573.

Figure 5:
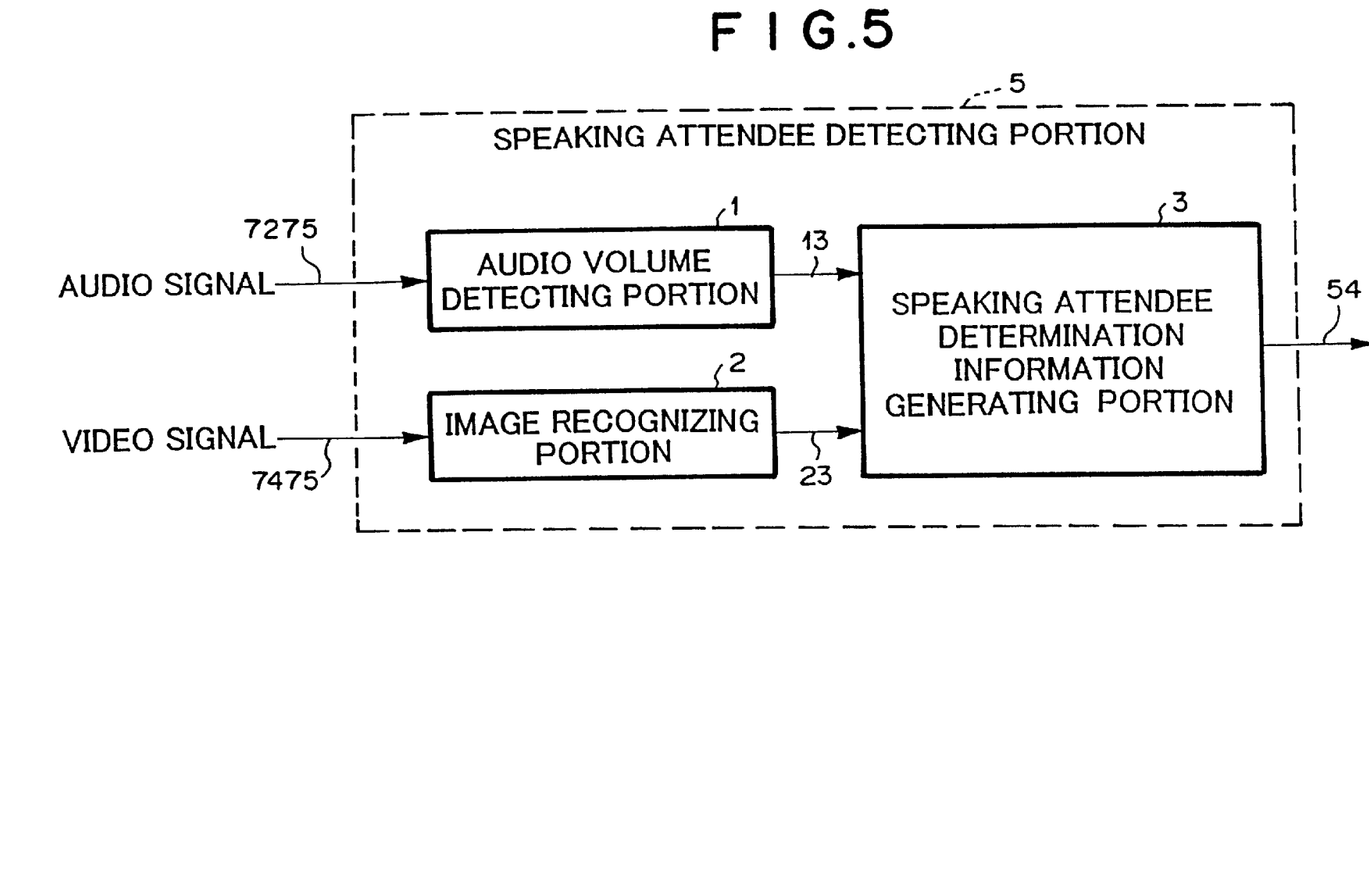
FIG. 5 is a block diagram showing the internal structure of a speaking attendee detecting portion shown in FIG. 4.

Next, with reference to FIG. 5, each of the speaking attendee detecting portions 5a to 5c will be described. Each of the speaking attendee detecting portion 5a to 5c is represented as a speaking attendee detecting portion 5. FIG. 5 is a block diagram showing the internal structure of the speaking attendee detecting portion 5. Referring to FIG. 5, the speaking attendee detecting portion 5 comprises an audio volume detecting portion 1, an image recognizing portion 2, and a speaking attendee determination information generating portion 3. An audio signal supplied to the audio volume detecting portion 1 through a connection line 7275 (7275a to 7275c) and a video signal supplied to the image recognizing portion 2 through a connection line 7475 (7475a to 7475c) are paired. These signals are received from the same conference terminal 6 (6a to 6c).

The audio volume detecting portion 1 receives the audio signal from the audio processing portion 72 through the connection line 7275 and supplies "speaking attendee determination information based on audio signal" to the speaking attendee determination information generating portion 3 through a the connection line 13. For example, the "speaking attendee determination information based on audio signal" is obtained by comparing the average value of the power of the audio signal in a predetermined time period with a predetermined threshold value. Practically, a predetermined threshold value is stored in the audio volume detecting portion 1. The audio volume detecting portion 1 compares the threshold value with the average value of the power of the audio signal and determines whether the average value of the power of the audio signal is equal to or larger than the predetermined threshold value (voice presence state) or smaller than the predetermined threshold value (voice absence state).

Alternatively, the "speaking attendee determination information based on audio signal" may be obtained in the following manner. For example, an audio signal is sampled by a sampling circuit (not shown). Parameters such as self correlation coefficients or line prediction coefficients are calculated corresponding to the sampled value and a pre-stored threshold value. The audio volume detecting portion 1 compares the calculated parameters with a predetermined threshold values and determines whether the audio signal is a voice or a non-voice (refer to JPA 6-83391).

The "speaking attendee determination information based on audio signal" obtained in the above-described manners is supplied to the speaking attendee determination information generating portion 3 through a connection line 13.

The image recognizing portion 2 receives the video signal from the video processing portion 74 through the connection line 7475, detects at least the lip portion of a conference attendee from the video signal, and extracts the change amount of the shape of the lip portion corresponding to the opening and closing actions thereof. In addition, the image recognizing portion 2 determines whether or not the change amount of the shape of the lip portion is equal to or larger than a predetermined threshold value (changed) or smaller than the predetermined threshold value (not changed). The detected result is supplied as "speaking attendee determination information based on video signal" to the speaking attendee determination information generating portion 3 through a connection line 23.

The change of the shape of the lip portion can be estimated in the following manner. Assuming that the shape of the lip portion is an ellipse, gradation information of the lip portion is extracted from a video signal. The aperture in the vertical direction of the lip portion is extracted from the gradation information. The chronological change of the aperture is obtained as a waveform. The waveform is converted into wavelets. A voice region is detected from the wavelets. Since the lip portion frequently moves in the voice period and the frequency thereof is relatively high, these characteristics are extracted from the analyzed result of the wavelets (refer to JPA 6-301393).

The speaking attendee determination information generating portion 3 generates final speaking attendee determination information for determining a speaking attendee corresponding to the "speaking attendee determination information based on audio signal" received through the connection line 13 and the "speaking attendee determination information based on video signal" received through the connection line 23 and supplies the generated speaking attendee determination information to the speaking attendee determining portion 4 through a connection line 54.

The final speaking attendee determination information is generated in the following manner. For example, only when the "speaking attendee determination information based on audio signal" represents a voice presence state and the "speaking attendee determination information based on video signal" represents a change of the shape of the lip portion simultaneously, the final speaking attendee determination information represents that a speaking attendee has been detected. Otherwise, the final speaking attendee determination information represents that a speaking attendee has not been detected.

In such a manner, the speaking attendee detecting portions 5a to 5c generate the final speaking attendee determination information for the respective conference terminals 6a to 6c and supply the generated final speaking attendee determination information to the speaking attendee determining portion 4 through the connection lines 54a to 54c, respectively. At intervals of a predetermined time period, the speaking attendee determining portion 4 measures a time period in which the speaking attendee determination information received from each of the speaking attendee detecting portions 5a to 5c represents that a speaking attendee has been detected.

Speaking attendee determining portion 4 determines that a conference terminal corresponding to the speaking attendee determination information that represents that a speaking attendee has been detected for the longest time period has a speaking attendee and supplies the determined result as speaking attendee information to controlling portion 73 through connection line 7573.

Controlling portion 73 generates the video control signal for the image switching process (that supplies a video signal of only a conference terminal determined as having a speaking attendee to the line interface portion 71) and the image combining process (that enlarges an image of a conference terminal determined as having a speaking attendee, combines the enlarged image with images of the other conference terminal untis, and supplies the resultant video signal to line interface portion 71) and supplies the video control signal to video processing portion 74.

As described above, according to the above-described embodiment of the present invention, since a speaking attendee is determined corresponding to both the "speaking attendee determination information based on audio signal" and "speaking attendee determination information based on video signal" rather than only the "speaking attendee determination information based on audio signal", a noise of such as a page turning noise does not largely affect the speaking attendee determining process. Thus, the television conference can be smoothly managed.

According to the embodiment of the present invention, conference terminal untis are disposed at three locations (A) to (C). However, the present invention can be applied to a television conference system having conference terminals disposed at more than three locations.

In addition, according to the above-described embodiment, speaking attendee determining portion 4 determines only one conference terminal as having a speaking attendee. However, when there are two or more conference terminals corresponding to the speaking attendee determination information representing that a speaking attendee has been detected for a predetermined time period or longer, the speaking attendee detecting portions 5a to 5c of speaking attendee detecting portion 75 may determine a relevant conference terminal as having a speaking attendee corresponding to a predetermined priority. In this case, with the video control signal that is supplied from controlling portion 73 to video processing portion 74, images of terminals determined as having speaking attendees can be equally combined.

In the multipoint television conference system according to the present invention, the multipoint controlling unit detects the volumes of audio signals and changes of images of video signals and determines a speaking attendee corresponding to the detected audio volumes and the change amounts of the images. Thus, even if an audio signal contains a noise such as a page turning noise and voices of other people along with a voice of a conference attendee, since an image of the motion of the lip portion of a conference attendee can be detected from a video signal, the speaking attendee can be determined. Consequently, a television conference can be prevented from incorrectly managed against an incorrect image switching operation.

Although the present invention has been shown and described with respect to the best mode embodiment thereof, it should be understood by those skilled in the art that the foregoing and various other changes, omissions, and additions in the form and detail thereof may be made therein without departing from the spirit and scope of the present invention.

What is claimed is:

1. A multipoint television conference system, comprising:
   terminals, and a multipoint control unit for controlling said terminals;
   wherein each of said terminals is provided for each attendee to the multipoint television conference; and
   wherein said multipoint control unit comprises:
   plural detection means, each of said plural detection means detects whether or not each attendee is speaking on the basis of an audio signal and video signal from each of said terminals in order to output a speaker detection signal representing a result of the detection;
   determination means for determining who are main speakers among the attendees on the basis of the speaker detection signals in order to generate a determination signal representing the main speakers; and
   combining means for combining the video signals on the basis of the speaker determination signal in order to output the combined video signal to said terminals;
   wherein each of said plural detection means comprises:
   volume detection means for detecting whether or not the audio signal from the corresponding terminal is louder than a first threshold to generate a voice detection signal;
   image recognition means for detecting whether or not a movement of a lip of the attendee to the corresponding terminal is larger than a second threshold to generate a movement detection signal; and
   means for generating the speaker detection signal on the basis of the voice detection signal and the movement detection signal.

2. The system according to claim 1, further comprising:
   mixing means for mixing the audio signals input from said terminals to output the mixed audio signal to said terminals.

3. The system according to claim 1, wherein the number of main speakers is one, and said combining means selects the video signal from the terminal corresponding to the main speaker as a main in the combined video signal.

4. The system according to claim 1, wherein said means for generating the speaker detection signal activates the speaker detection signal when the audio signal is louder than said first threshold and the movement of the lip is larger than the second threshold simultaneously.

5. The system according to claim 1, wherein said determination means comprises means for determining the main speakers on the basis of periods, in each of which each of the speaker detection signal is active.

6. A multipoint television conference system, comprising:
   a plurality of terminals;
   a multipoint control unit which controls said terminals;
   wherein each of said terminals is provided for each attendee to said multipoint television conference; and wherein said multipoint control unit comprises:
- a plurality of detection units, each of said detection units detects whether or not each attendee is speaking on the basis of an audio signal and video signal from each of said terminals in order to output a speaker detection signal representing a result of said detection;
- a speaking attendee determination portion which determines a main speaker among the attendees on the basis of the speaker detection signals in order to generate a determination signal representing the main speaker; and
- a combiner which combines the video signals on the basis of the speaker determination signal and outputs a combined video signal to said terminals;

wherein each of said detection units comprises:
- a volume detector which detects whether or not the audio signal from a corresponding terminal is louder than a first threshold to generate a voice detection signal;
- an image recognition processor which detects whether or not a movement of a lip of an attendee at said corresponding terminal is larger than a second threshold to generate a movement detection signal; and
- a processor which generates said speaker detection signal on the basis of the voice detection signal and the movement detection signal.

* * * * *